United States Patent
Moon

(10) Patent No.: US 7,580,107 B2
(45) Date of Patent: Aug. 25, 2009

(54) LIQUID CRYSTAL DISPLAY AND TESTING METHOD THEREOF

(75) Inventor: Sung-Jae Moon, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 10/619,665

(22) Filed: Jul. 15, 2003

(65) Prior Publication Data

US 2004/0095549 A1   May 20, 2004

(30) Foreign Application Priority Data

Nov. 19, 2002   (KR) ...................... 10-2002-0071920

(51) Int. Cl.
*G02F 1/13* (2006.01)
(52) U.S. Cl. .................................... 349/192
(58) Field of Classification Search .................. 349/192
See application file for complete search history.

(56) References Cited

U.S. PATENT DOCUMENTS

| | | | |
|---|---|---|---|
| 4,840,459 A | | 6/1989 | Strong et al. |
| 5,349,226 A | | 9/1994 | Kawaguchi et al. |
| 5,576,730 A | * | 11/1996 | Shimada et al. ............... 345/98 |
| 5,608,558 A | * | 3/1997 | Katsumi ..................... 349/192 |
| 5,774,100 A | * | 6/1998 | Aoki et al. .................... 345/87 |
| 6,392,719 B2 | | 5/2002 | Kim ............................ 349/40 |
| 6,424,400 B1 | * | 7/2002 | Kawasaki ................... 349/149 |
| 6,624,857 B1 | * | 9/2003 | Nagata et al. ................. 349/54 |
| 6,784,862 B2 | * | 8/2004 | Kodate et al. ................. 345/92 |
| 2001/0046997 A1 | | 11/2001 | Abraham et al. |
| 2002/0085169 A1 | * | 7/2002 | Choi et al. .................. 349/192 |

FOREIGN PATENT DOCUMENTS

| | | |
|---|---|---|
| CN | 1314671 A1 | 9/2001 |
| JP | 7146481 A | 6/1995 |
| JP | 8201841 A | 8/1996 |
| JP | 11-352505 | 12/1999 |
| JP | 2001-264788 A | 9/2001 |
| JP | 2001-324721 A | 11/2001 |
| JP | 2002-090424 A | 3/2002 |
| KR | 1020000007737 | 2/2000 |
| KR | 1020000077275 | 12/2000 |
| KR | 1020010087355 | 9/2001 |
| WO | 0246833 | 6/2002 |

* cited by examiner

*Primary Examiner*—James A Dudek
(74) *Attorney, Agent, or Firm*—Cantor Colburn LLP

(57) ABSTRACT

The present invention provides an LCD including a liquid crystal panel including a plurality of first display signal lines, a plurality of second display signal lines crossing the first display signal lines, a plurality of switching elements each of which is connected to both of one of the first display signal lines and one of the second display signal lines, pixel electrodes being respectively connected to the switching element, and one or more inspection lines for transmission of test signal to the second display signal lines. The inspection lines are separated from the first and second display signal lines, the switching elements, and the pixel electrodes, and they include one or more test pads for receiving an externally applied test signal. The test pads are formed at positions where one or more external devices are attached to the liquid crystal panel. The locations of test pads and inspection lines for the testing of the data and gate lines are moved from between driving ICs to under the driving ICs, and therefore spatial room of the LC panel assembly is enhanced. Furthermore, the connecting lines interconnecting driving ICs can be formed in a linear pattern without curves or winding, and accordingly, resistance and signal delay in the lines are reduced.

10 Claims, 8 Drawing Sheets

LIQUID CRYSTAL DISPLAY AND TESTING METHOD THEREOF

BACKGROUND OF THE INVENTION a) Field of the Invention

The present invention relates to a liquid crystal display (LCD) and a testing method thereof.

b) Description of Related Art

A typical liquid crystal display (LCD) includes two panels and a liquid crystal (LC) layer having dielectric anisotropy. The LC layer is interposed between the two panels. A desired image is realized at an LCD by adjusting transmittance of light passing though the LC layer, and the adjustment of transmittance is achieved by varying the strength of an electric field applied to the LC layer. Such an LCD has become popular in the field of flat panel displays (FPDs), and a TFT-LCD that uses a thin film transistor (TFT) as a switching element has become the most common LCD.

One of the two panels has the TFTs formed thereon, and pluralities of gate lines and data lines respectively extend in row and column directions on the panel. The gate lines and data lines are connected to pixel electrodes through the TFTs. The TFTs control transmission of data signals to the pixel electrodes under the control of gate signals received through the gate lines.

The gate signals are produced at a plurality of gate driving integrated circuits (ICs). The gate driving ICs receive a gate-on voltage and a gate-off voltage from a driving voltage generator that has one or more DC/DC converters, and combines them to produce the gate signals under the control of a signal controller. The data signals are produced at a plurality of data driving ICs that convert image signals of the signal controller to analog voltages.

The signal controller, the driving voltage generator, etc. are usually provided on printed circuit boards (PCBs) that are disposed to the outside of the panel, and the driving ICs are mounted on flexible printed circuit (FPC) films disposed between the panel and the PCBs. An LCD is usually provided with two PCBs, e.g., one disposed at an upper side of the panel, and another disposed at a left side thereof. The left one is usually called a gate PCB, and the upper one a data PCB. The gate driving ICs, being disposed between the gate PCB and the panel, receive signals from the gate PCB, and the data driving ICs, being disposed between the data PCB and the panel, receive signals from the data PCB.

Some LCDs include only the data PCB without the gate PCB. The gate side FPC films and the gate driving ICs mounted thereon may remain at their original positions. In this case, for signal transmission from the signal controller, the driving voltage generator, etc., to the gate driving ICs, additional signal lines are provided on data FPC films and the panels in addition to the gate FPC films.

Some LCDs have neither a gate PCB nor a gate FPC film. The gate driving ICs are mounted directly on one of the panels, and, in addition, the data driving ICs may also be mounted on the panel, which is called a chip-on-glass (COG) type. In this case, for signal transmission to the gate driving ICs, additional signal lines may be provided on the data FPC films and the panel. The data driving ICs mounted directly on the panel still receive signals via the data FPC film.

Visual inspection (VI) tests are executed for the test of the operation of an LCD. For VI tests of LCDs of such a COG type, inspection lines for the data driving ICs are additionally formed on the panel, and test pads for application of test signals to the inspection lines are formed between adjacent data driving ICs. The size of the test pads should be more than a predetermined dimension, e.g., 800 μm×800 μm, to ensure sufficient reliability of the VI test.

For the VI test of a COG type LCD, a plurality of connecting lines are usually formed between data driving ICs such that an image signal firstly applied to the leftmost data driving IC may be consecutively sent to all other data driving ICs through the connecting lines.

Therefore, in this case, the connecting lines, test pads, and inspection lines should be included in narrow regions between data driving ICs, but in general, such an arrangement of lines and pads for tests between data driving ICs is not optimal.

In more detail, in designing such an LCD, layout of the inspection lines and test pads are firstly determined between the data driving ICs, and subsequently, signal lines such as the connecting lines are designed at positions that do not interfere with the inspection lines and test pads. Accordingly, in general, the signal lines cannot have a linear pattern and they have many curves and windings, which lengthens the signal lines, which in turn increases wire resistance and signal delay such that signal transmission is mal-effected.

SUMMARY OF THE INVENTION

The motivation for the present invention is to provide a non-limiting advantage of increased spatial room in a liquid crystal panel without losing its test pads and inspection line. Another motivation is to provide an advantage of eliminating a malfunctional effect of the test pads and inspection lines to connecting lines for communication between driving ICs. An additional motivation is to provide an advantage of reduced resistance and signal delay in lines between driving ICs.

An exemplary LCD useful with the present invention includes a liquid crystal panel. The liquid crystal panel includes a plurality of first display signal lines, a plurality of second display signal lines crossing the first display signal lines, a plurality of switching elements connected to the first display signal lines and the second display signal lines, a plurality of pixel electrodes being respectively connected to the switching element, and at least one inspection line for transmission of test signals to the second display signal lines. The at least one inspection line is separated from the first and second display signal lines, the switching elements, and the pixel electrodes.

The at least one inspection line includes a test pad for receiving an externally applied test signal, and the test pad is formed at a position where an external device is attached to the liquid crystal panel.

In a further embodiment, the at least one inspection line comprises at least two inspection lines, and the second display signal lines are alternately connected to the at least two inspection lines.

In another further embodiment, a plurality of drivers connected to the second display signal lines are further included. In this case, it is preferable that a plurality of connecting lines interconnecting the drivers are further included. More preferably, the connecting lines extend straight.

In a further preferable embodiment, the test pad is closer to an edge of the liquid crystal panel than to the connecting lines. More preferably, the test pad is disposed between the driver and an edge of the liquid crystal panel. Each of the drivers is preferably formed as a chip.

In another further embodiment, a plurality of flexible printed circuit films attached to the liquid crystal panel are further included, and the external devices are the flexible printed circuit films.

In a yet further embodiment, the at least one inspection line and the second display signal line are electrically separated.

In this case, a connecting member including the same layer as the pixel electrodes is preferably connected to at least one of the at least one inspection line and the second display signal lines. The at least one inspection line preferably includes the same material as at least one of the first display signal lines, the second display signal lines, and the pixel electrodes.

An exemplary testing method of an above described LCD useful with the present invention includes driving the pixel electrodes through the switching elements by applying a first test signal to the first display signal lines and a second test signal to the second display signal lines, and disconnecting the connection between the second display signal lines and the at least one inspection line.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

Figure 1:
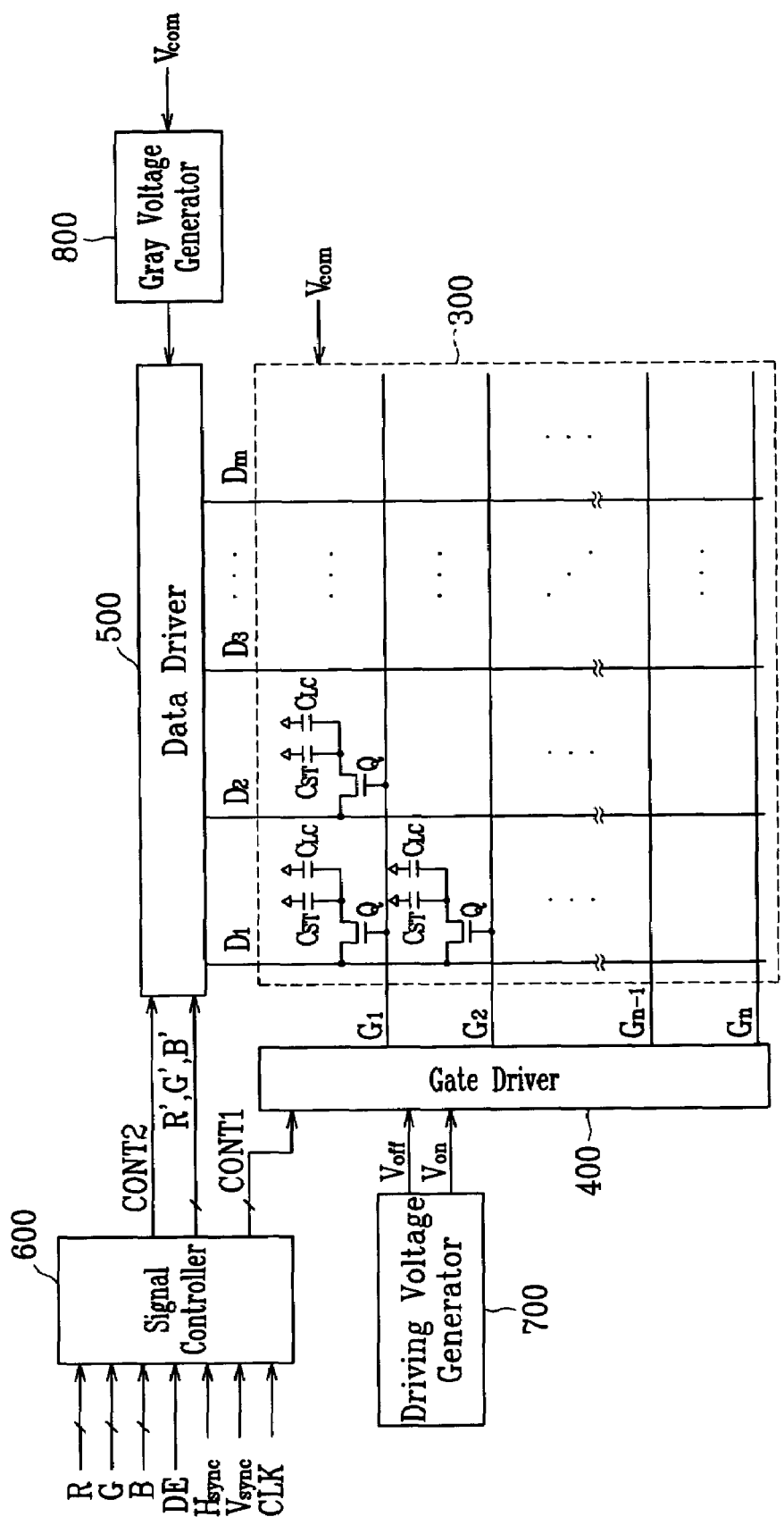
FIG. 1 is a block diagram of an LCD according to a preferred embodiment of the present invention.

The present invention will be described more fully hereinafter with reference to the accompanying drawings, in which preferred embodiments of the invention are shown. This invention may, however, be embodied in many different forms and should not be construed as being limited to the embodiments set forth herein.

In the drawings, the thickness of layers and regions are exaggerated for clarity. Like numerals refer to like elements throughout. It will be understood that when an element such as a layer, film, region, substrate, or panel is referred to as being "on" another element, it can be directly on the other element or intervening elements may also be present. In contrast, when an element is referred to as being "directly on" another element, there are no intervening elements present.

Figure 2:
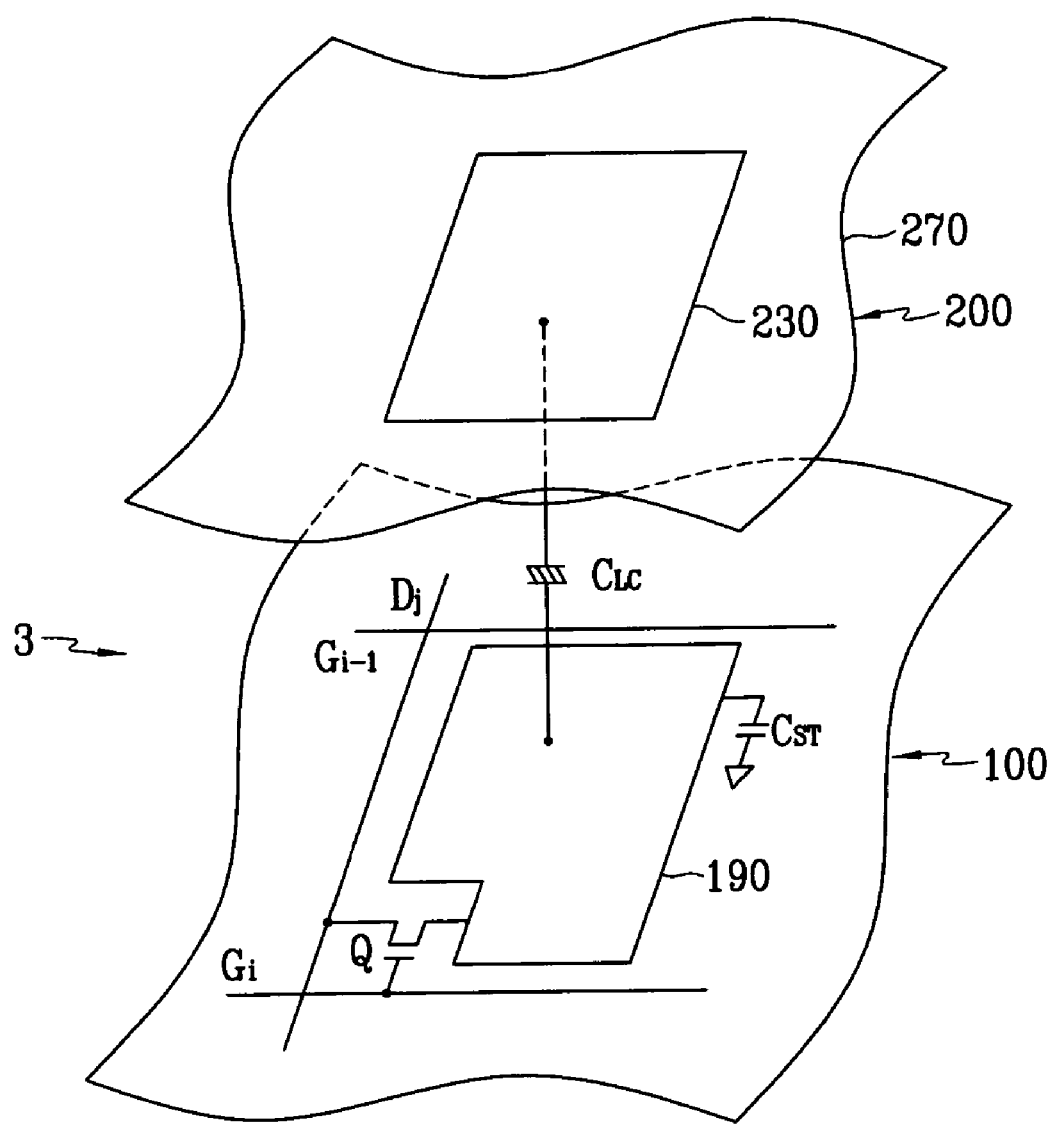
FIG. 2 is an equivalent circuit diagram for a pixel of an LCD according to a preferred embodiment of the present invention.

FIG. 1 is a block diagram of an LCD according to a preferred embodiment of the present invention, and FIG. 2 is an equivalent circuit for a pixel of an LCD according to a preferred embodiment of the present invention.

As shown in FIG. 1, an LCD according to a preferred embodiment of the present invention includes a LC panel assembly 300, a gate driver 400 and a data driver 500 both connected to the assembly 300, a driving voltage generator 700 connected to the gate driver 400, a gray voltage generator 800 connected to the data driver 500, and a signal controller 600 for the control of the LCD.

The LC panel assembly 300 has a plurality of display signal lines $G_1$-$G_n$ and $D_1$-$D_m$, and a plurality of pixels connected thereto. The pixels are arranged substantially in a matrix. In a structural viewpoint, the LC panel assembly 300 includes a lower panel 100, an upper panel 200 facing the lower panel 100, and a LC layer 3 interposed therebetween.

The display signal lines $G_1$-$G_n$ and $D_1$-$D_m$ include a plurality of gate lines $G_1$-$G_n$ that transmit gate signals (also called "scanning signals"), and also include a plurality of data lines $D_1$-$D_m$ that transmit data signals. The gate lines $G_1$-$G_n$ extend substantially in a row direction, and they are substantially parallel to one another. The data lines $D_1$-$D_m$ extend substantially in a column direction, and they are also substantially parallel to one another.

Each pixel includes a switching element Q connected to the signal lines $G_1$-$G_n$ and $D_1$-$D_m$, and a pair of capacitors, i.e., a LC capacitor $C_{LC}$ and a storage capacitor $C_{ST}$, that are connected to the switching element Q. The storage capacitor $C_{ST}$ may be omitted depending on embodiments.

The switching element Q has three terminals. A control terminal thereof is connected to one of the gate lines $G_1$-$G_n$, and an input terminal thereof is connected to one of the data lines $D_1$-$D_m$. An output terminal of the switching element Q is connected to both the LC capacitor $C_{LC}$ and storage capacitor $C_{ST}$. FIG. 2 illustrates the switching element Q of a MOS transistor as an example, and the MOS transistor is realized by a TFT that has a channel layer of amorphous silicon or polysilicon.

The LC capacitor $C_{LC}$ has two terminals of a pixel electrode 190 on the lower panel 100 and a common electrode 270 on the upper panel 200, and the LC layer 3 interposed between the two electrodes 190 and 270 functions as a dielectric medium. The pixel electrode 190 is connected to the switching element Q. The common electrode 270 covers the entire surface of the upper panel 200 and receives a common voltage $V_{com}$.

Differently from FIG. 2, the common electrode 270 may be formed on the lower panel 100, and in this case, the two electrodes 190 and 270 have a linear or bar-shaped pattern.

The storage capacitor $C_{ST}$ is an auxiliary capacitor for providing capacitance in addition to that of the LC capacitor $C_{LC}$. The storage capacitor $C_{ST}$ includes the pixel electrode 190 and a separate signal line (not shown) on the lower panel 100, wherein the separate signal line overlaps the pixel electrode 190, interposing an insulating material, and is supplied with a predetermined voltage such as the common voltage $V_{com}$. Instead of the separate wire, the storage capacitor $C_{ST}$ may include an adjacent gate line (which is frequently called a previous gate line) that overlaps the pixel electrode 190, interposing an insulating material.

By changing the electric field produced by the pixel electrode 190 and the common electrode 270, orientations of LC molecules are changed, and accordingly polarization of light passing through the LC layer 3 is also changed. The change of polarization is converted into change of transmittance of light at polarizers (not shown) attached to the panels 100 and 200.

In order to realize colors by the LCD, each pixel should be able to display colors, and this can be achieved by providing one of red, green, or blue color filters 230 at a position that corresponds to the pixel electrode 190. Although FIG. 2 shows that the color filter 230 is positioned on the upper panel 200, its position may be changed to be above or below the pixel electrode 190 on the lower panel 100.

Polarizers (not shown) are attached, in pairs, on the outer surfaces of the lower panel 100 and the upper panel 200.

Referring back to FIG. 1, the driving voltage generator 700, having one or more DC/DC converters, generates a gate-on voltage $V_{on}$ for turning the switching element Q on and a gate-off voltage $V_{off}$ for turning it off.

Although not shown in the drawings, a common voltage generator may be added to generate the common voltage ($V_{com}$) from a voltage of the DC/DC converter.

The gray voltage generator 800 generates two sets of plural gray voltages related to the transmittance of the pixels. Gray voltages in one set have positive values relative to the common voltage $V_{com}$, and those in the other set have negative values.

The gate driver 400, which is also called a scan driver, is connected to the gate lines $G_1$-$G_n$ of the LC panel assembly 300 such that it produces gate signals as a combination of the gate-on and gate-off voltages $V_{on}$ and $V_{off}$ of the driving voltage generator 700, and applies the gate signals to the gate lines $G_1$-$G_n$.

The data driver 500, which is also called a source driver, is connected to the data lines $D_1$-$D_m$ of the LC panel assembly 300 such that it produces data signals from gray voltages of the gray voltage generator 800 and applies the data signals to the data lines $D_1$-$D_m$.

The signal controller 600 generates control signals for controlling the gate driver 400 and the data driver 500, and respectively applies the control signals thereto.

A structure of an LCD according to a preferred embodiment of the present invention is hereinafter described in detail with reference to FIG. 3.

Figure 3:
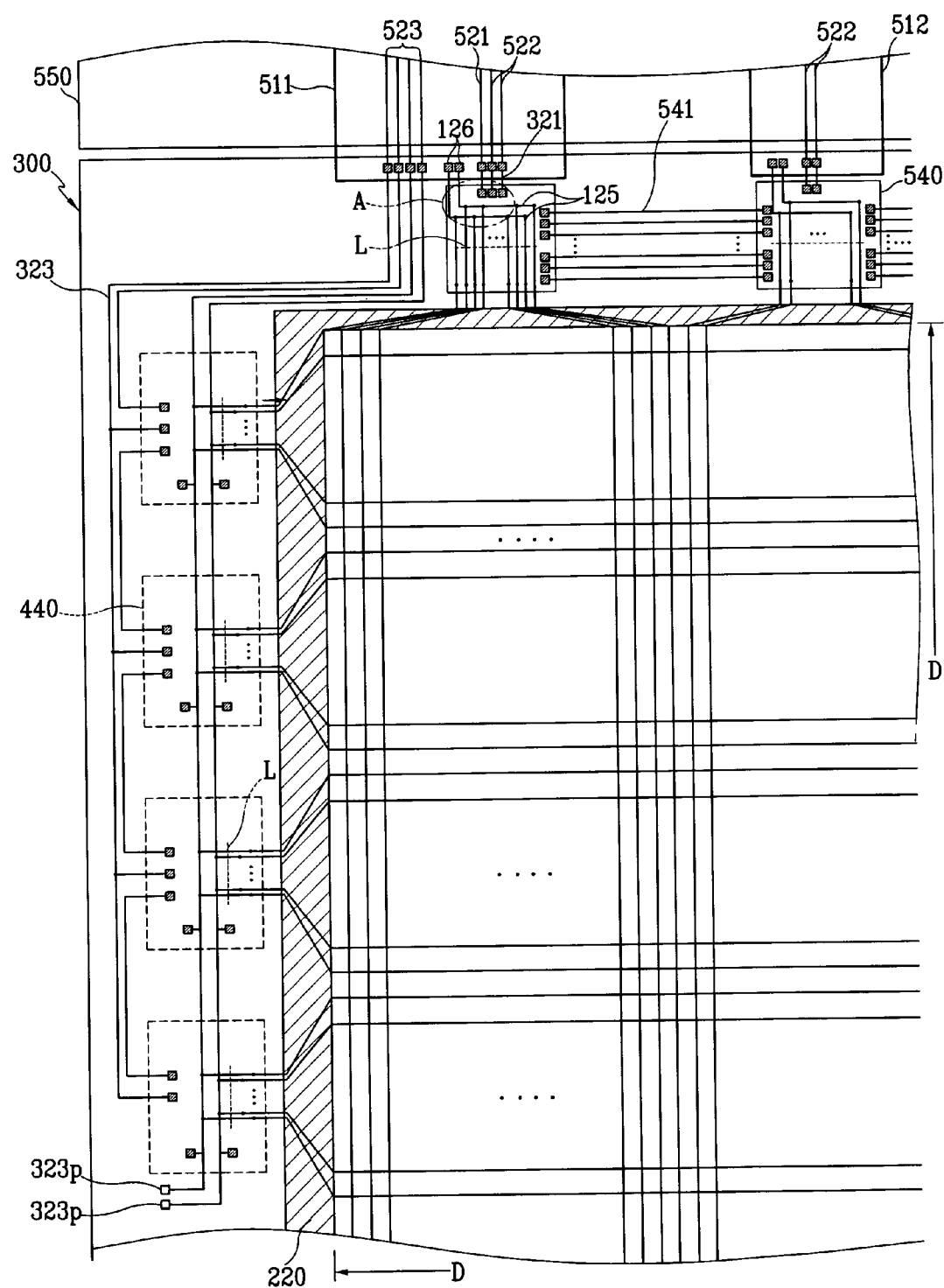
FIG. 3 is a layout view of an LCD according to a preferred embodiment of the present invention.

FIG. 3 is a layout view of an LCD according to a preferred embodiment of the present invention.

As shown in FIG. 3, a PCB 550 is disposed above the LC panel assembly 300 having the gate lines $G_1$-$G_n$ and the data lines $D_1$-$D_m$ thereon. Circuital elements such as the signal controller 600, the driving voltage generator 700, and the gray voltage generator 800 are provided on the PCB 550. The LC panel assembly 300 and the PCB 550 are interconnected electrically and physically by a plurality of flexible printed circuit (FPC) films 511 and 512. The gate driver 400 and the data driver 500 respectively include a plurality of gate driving ICs 440 and a plurality of data driving ICs 540 that are mounted on the panel assembly 300.

The leftmost FPC film 511 has a plurality of data transmission lines 521 and a plurality of signal lines 522 and 523 formed thereon. The data transmission lines 521 are connected to input terminals of the data driving ICs 540 via a plurality of lead lines 321 provided on the panel assembly 300, and they transmit image data to the data driving ICs 540. The driving signal lines 522 and 523 transmit power voltage and control signals, which are required for operation of the driving ICs 540 and 440, to the driving ICs 540 and 440 via the lead lines 321 and driving signal lines 323.

The remaining FPC film 512 has a plurality of driving signal lines 522 formed thereon, which transmit driving signals and control signals to the data driving ICs 540 connected thereto.

The signal lines 521-523 are connected to circuital elements of the PCB 550, and receive signals therefrom.

The driving signal lines 523 may be formed on a separate FPC film (not shown).

As shown in FIG. 3, the horizontally aligned gate lines $G_1$-$G_n$ and the vertically aligned data lines $D_1$-$D_m$ cross each other on the LC panel assembly 300 to form a plurality of pixel areas, and the plurality of pixel areas form a display region D. A black matrix 220 is prepared outside (refer to the hatched portion) of the display region D for the purpose of preventing light from leaking from the display region D.

The gate lines $G_1$-$G_n$ and the data lines $D_1$-$D_m$ respectively remain substantially parallel in the display region D. Just outside the display region D, they converge group by group in a pie pattern (like a fan) such that gaps between adjacent lines become reduced. Alignment of the lines then becomes substantially parallel again, and this area is called a fan-out area.

Above the display region D, a plurality of the data driving ICs 540 are consecutively mounted in a row direction at the top margin of the LC panel assembly 300. A plurality of connecting lines 541 are formed between adjacent ICs, and therefore image signals supplied firstly to the leftmost data driving IC 540 through the FPC film 511 are consecutively transmitted to all other data driving ICs 540.

In addition, one or more VI inspection lines 125 are formed under each data driving IC 540. Each inspection line 125, principally aligned in a row direction, has a branch extending upward, and a test pad 126 is formed at an end of the branch.

The inspection lines 125 are connected to the data lines $D_1$-$D_m$. In the case that the number of the inspection lines is more than one, they are alternately connected to the data lines $D_1$-$D_m$. As an example, FIG. 3 shows two inspection lines 125, and in this case, odd-numbered data lines $D_1$, $D_3$, etc. are connected to the upper inspection line and even-numbered data lines $D_2$, $D_4$, etc. are connected to a lower inspection line.

The test pads 126 are located at positions where the FPC films 511 and 512 are electrically interconnected with the panel assembly 300, or alternatively, at positions above the data driving ICs 540 or higher than the portions through which the data lines $D_1$-$D_m$ receive signals.

In this way, the test pads 126 and the inspection lines 125 are moved from between the data driving ICs 540. In particular, the inspection lines 125 come to lie under the data driving ICs 540. Accordingly, the connecting lines 541 between adjacent ICs are formed in a perfect linear pattern without any curves or winding, and thus resistance and signal delay in the lines are reduced.

The gate driving ICs 440 (shown as four in FIG. 3) are mounted near the left edge of the panel assembly 300, and are arranged in the column direction. The above-mentioned driving signal lines 323 are formed around the gate driving ICs 440. The driving signal lines 323 electrically connect the gate driving ICs 440 to the driving signal lines 523 of the FPC film, or interconnect adjacent gate driving ICs 440.

Among the driving signal lines 323, two lines that are near the display region D are alternately connected to the gate lines $G_1$-$G_n$, and each of them has a test pad 323p at its end for testing of the gate lines $G_1$-$G_n$ and pixels.

As described above, the LC panel assembly 300 includes two panels 100 and 200, and the lower panel 100 provided with TFTs is called a "TFT panel." As shown in FIG. 3, the driving signal lines 323, the lead lines 321, the connecting lines 541, the VI inspection lines 125, and the test pads 126 are provided on the TFT panel 100, and the structure of the TFT panel 100 is hereinafter described in detail with reference to FIGS. 4-8.

Figure 4:
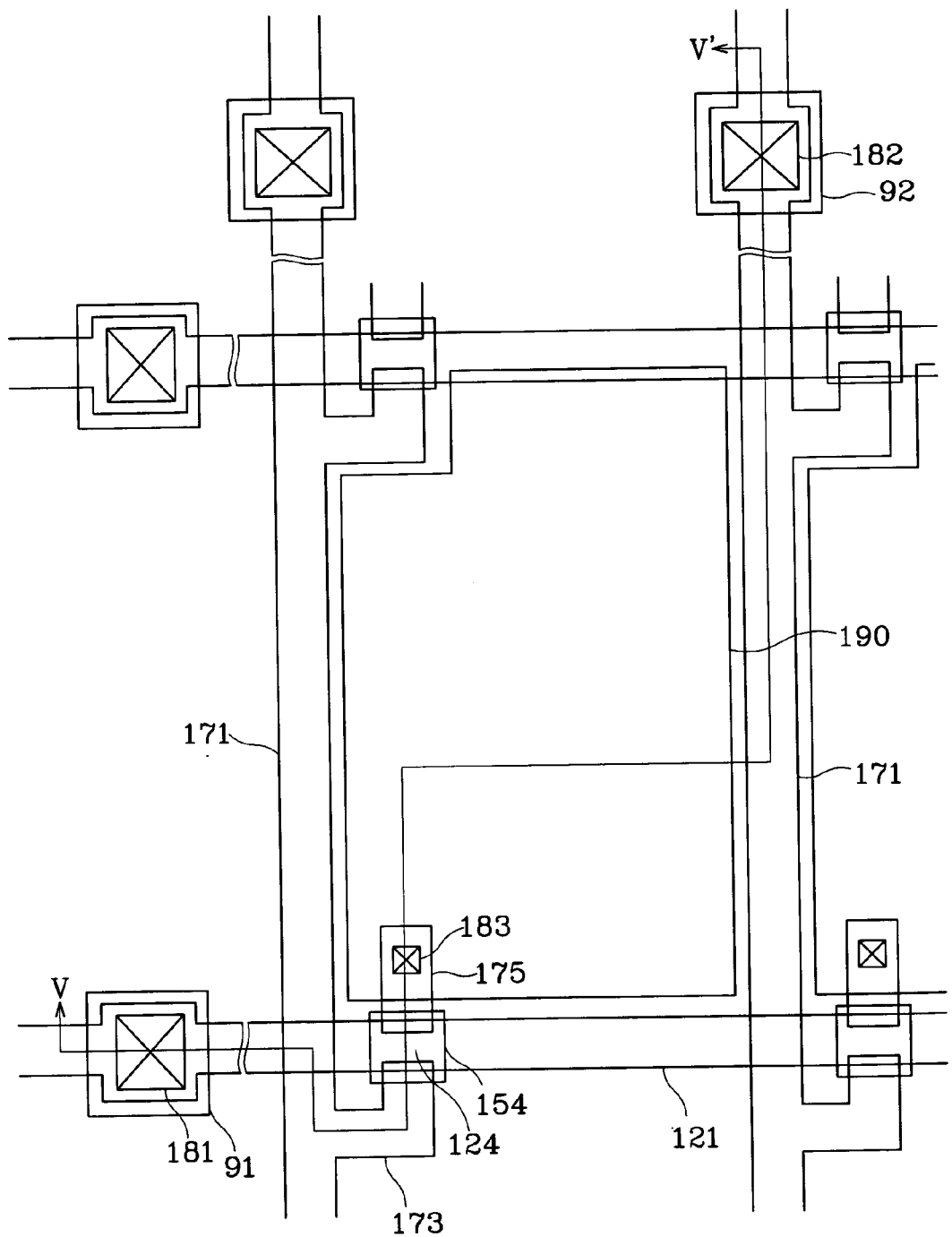
FIG. 4 a layout view of a TFT panel for an LCD according to a preferred embodiment of the present invention, in which an intersecting region of data and gate lines of FIG. 3 and contact portions respectively connected to the gate and data lines are enlarged.
Figure 5:
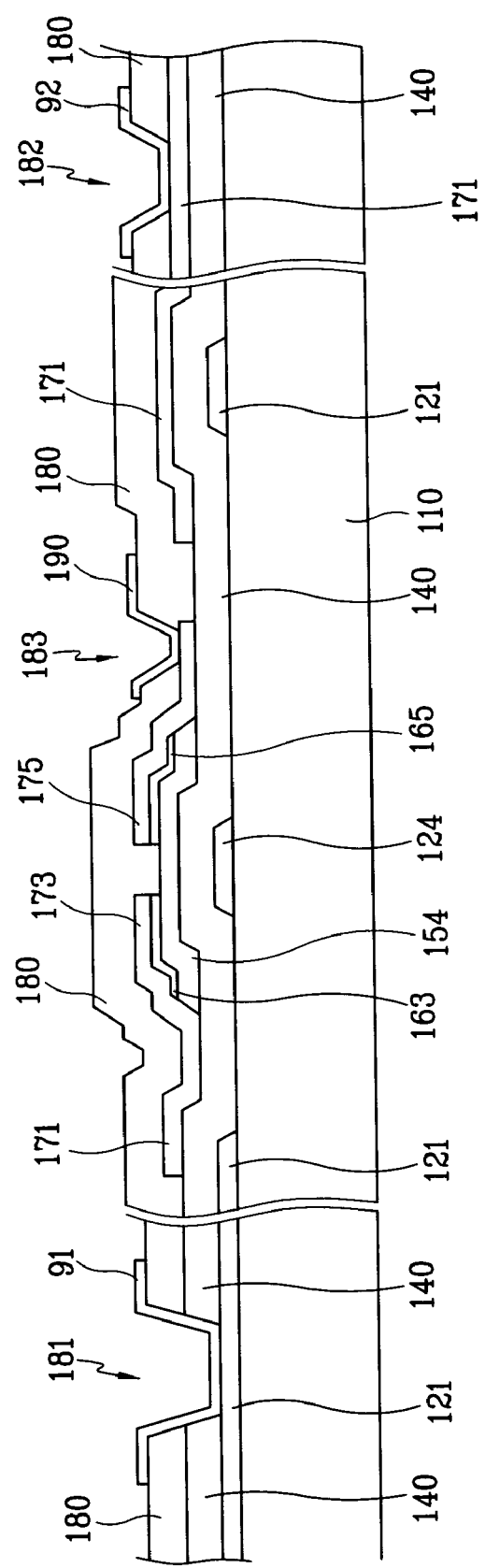
FIG. 5 is a sectional view of a TFT panel shown in FIG. 4, the section being taken along line V-V' of FIG. 4.

FIG. 4 is a layout view of a TFT panel for an LCD according to a preferred embodiment of the present invention, in which an intersecting region of data and gate lines of FIG. 3 and contact portions C1 and C2 respectively connected to the gate and data lines are enlarged. FIG. 5 is a sectional view of the TFT panel, the section being taken along line V-V' of FIG. 4.

Figure 6:
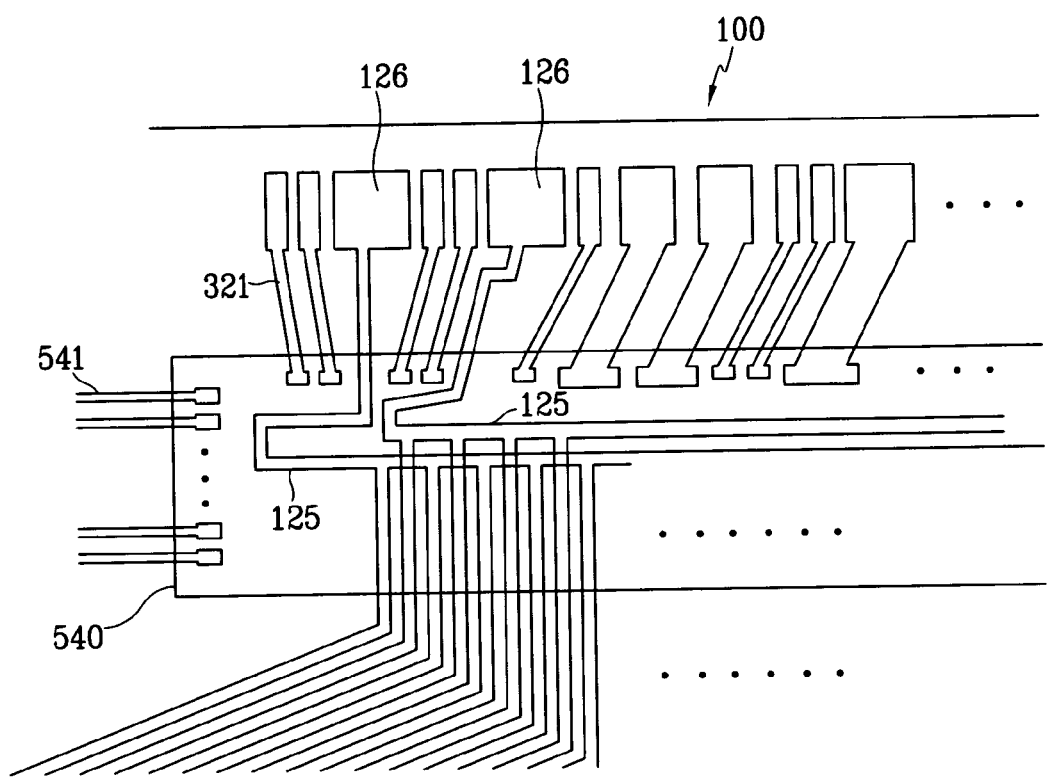
FIG. 6 is an enlarged view of region A of FIG. 3 according to a preferred embodiment of the present invention.
Figure 7:
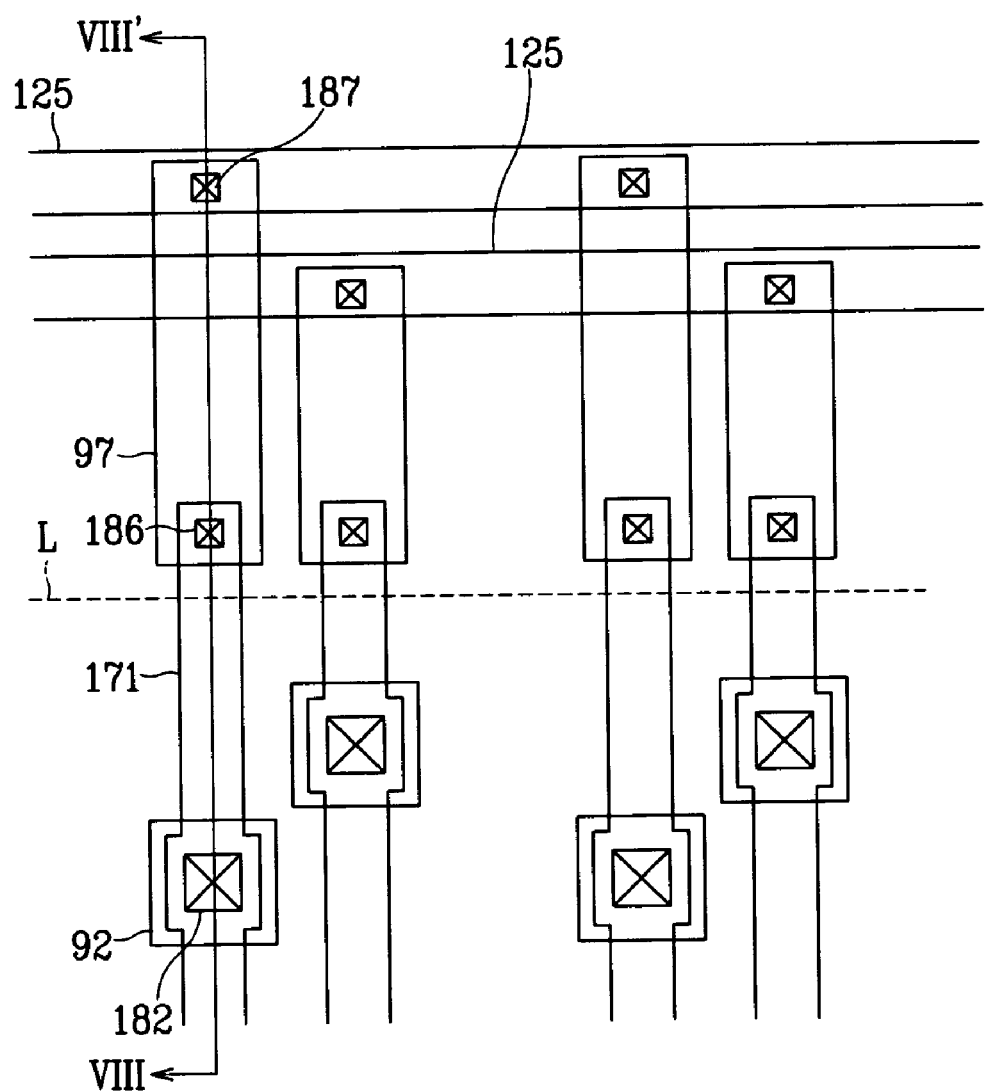
FIG. 7 is an enlarged view of connections between data lines and inspection lines according to a preferred embodiment of the present invention.
Figure 8:
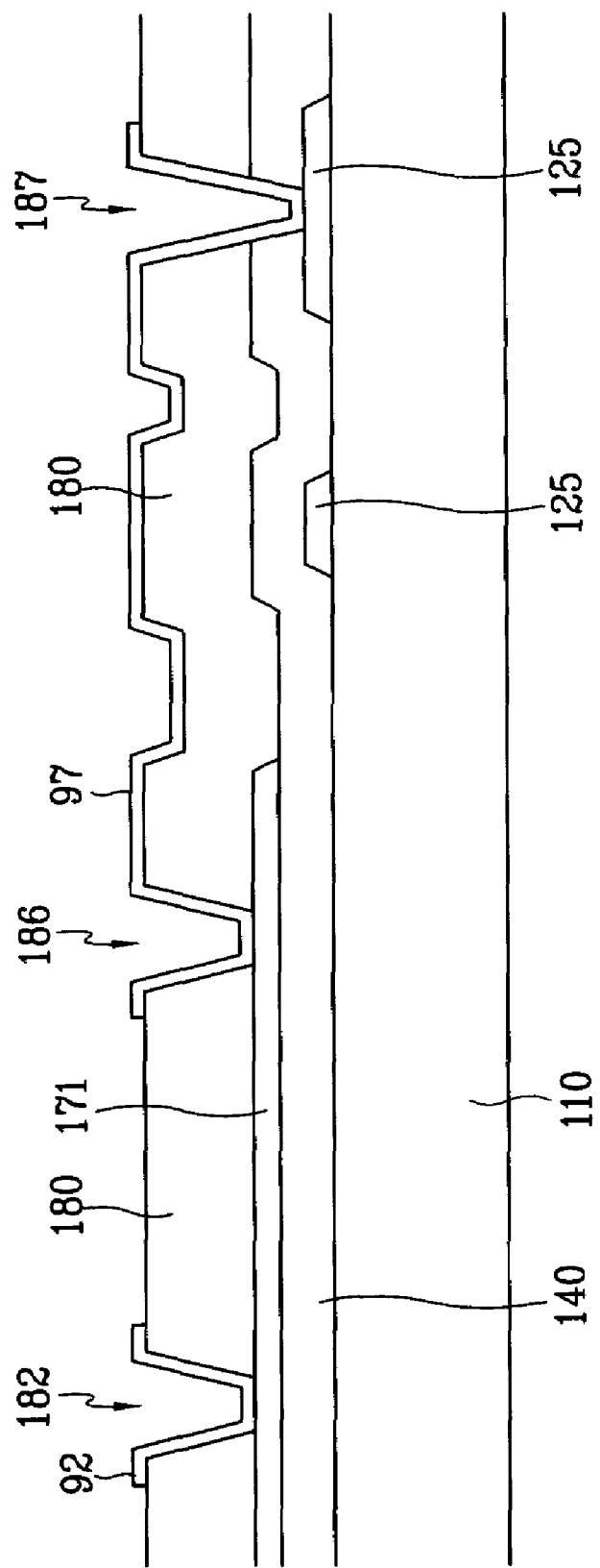
FIG. 8 is a sectional view of a TFT panel, the section being taken along line VIII-VIII' of FIG. 7.

FIG. 6 is an enlarged view of a region A of FIG. 3 according to a preferred embodiment of the present invention. FIG. 7 is an enlarged view for connections between data lines and inspection lines according to a preferred embodiment of the present invention, and FIG. 8 is a sectional view of a TFT panel, the section being taken along line VIII-VIII' of FIG. 7.

A plurality of gate lines 121, the inspection lines 125, the connecting lines 541, and the lead lines 321 are formed on an insulating substrate 110. They are made of metal or other conducting materials, and the metal used for them may be exemplified as aluminum (Al) or an alloy thereof, molybdenum (Mo) or a molybdenum-tungsten alloy (MoW), chromium (Cr), and tantalum (Ta).

The gate lines 121 extend substantially in a row direction, and parts of them form gate electrodes 124.

Each inspection line 125 extends substantially in a row direction, and has a branch that extends upward such that a test pad 126 is formed at its end.

As shown in FIG. 6, the upper inspection line is connected to odd-numbered data lines $D_1$, $D_3$, etc., and the lower inspection line is connected to even-numbered data lines $D_2$, $D_4$, etc. The test pads 126 are disposed between lead lines 321.

The gate lines 121, the inspection lines 125, the connecting lines 541, and the lead lines 321 may be single-layered or multi-layered. In the case of multiple layers, they include a layer having a low resistivity and another layer showing good electrical contact characteristics with different materials. The multiple layers may preferably be exemplified by a pair of layers of chromium and an aluminum alloy, or molybdenum (or an alloy thereof) and aluminum.

The driving signal lines 323 shown in FIG. 3 are formed on the same layer as the gate lines 121.

The gate lines 121, inspection lines 125, lead lines 321, and connecting lines 541 are covered with a gate insulating layer 140 that is formed of, e.g., silicon nitride ($SiN_x$).

A plurality of semiconductor islands 154 preferably made of hydrogenated amorphous silicon (a-Si) are formed on the gate insulating layer 140 at positions opposite to the gate electrodes 124. A pair of ohmic contacts 163 and 165 are formed on each of the semiconductor islands 154. The ohmic contacts 163 and 165 preferably include hydrogenated amorphous silicon heavily doped with n type impurities, e.g., phosphorus (P). The ohmic contacts 163 and 165 are separated from each other with respect to the gate electrode 124.

A plurality of data lines 171 and drain electrodes 175 are formed on the ohmic contacts 163 and 165 and the gate insulating layer 140, and they are made of metal or other conducting materials, where the metal may be exemplified by aluminum or an alloy thereof, molybdenum or a molybdenum-tungsten alloy, chromium, and tantalum.

Each data line 171 extends substantially in a column direction, and a plurality of branches of each data line 171 form a plurality of source electrodes 173. The drain electrodes 175 are located opposite the source electrodes 173 with respect to the gate electrodes 124, and separated from the data lines 171.

The data lines 121 and the drain electrodes 175 may be single layered or multi-layered, like the case of the gate lines 121. In the case of multiple layers, they include a layer having a low resistivity material and another layer showing good electrical contact characteristics with different materials.

The inspection lines 125, the connecting lines 541, and the lead lines 321 may be formed in the same layer as the data lines 171.

The gate electrodes 124, the semiconductor islands 154, the source electrodes 173, and the drain electrodes 175 cooperatively form TFTs.

A passivation layer 180, preferably made of SiNx or an organic insulator, is formed on the data lines 171, the drain electrodes 175, and portions of the semiconductor islands 154 and the gate insulating layer 140 that are not covered therewith.

The passivation layer 180 has a plurality of contact holes 182, 186, and 183 exposing portions of the data lines 171 and portions of the drain electrodes 175. The passivation layer 180 and the gate insulating layer 140 have a plurality of contact holes 181, 186, and 187 exposing portions of the gate lines 121 and the inspection lines 125. The passivation layer 180 further has contact holes (not shown) exposing portions of the test pads 126, lead lines 321, and the driving signal lines 323.

A plurality of pixel electrodes 190, a plurality of contact assistants 91 and 92, and a plurality of connecting members 97 are formed on the passivation layer 180. The pixel electrodes 190, the contact assistants 91 and 92, and the connecting members 97 are preferably made of a transparent conductive material such as indium tin oxide (ITO) or indium zinc oxide (IZO).

The pixel electrodes 190 are connected to the drain electrodes 175 through the contact holes 183, and receive the data signals therefrom.

The contact assistants 91 and 92 are respectively connected to end portions of the gate lines 121 and the data lines 171 through the contact holes 181 and 182. The contact assistants 91 and 92 protect the end portions of the gate lines 121 and the data lines 171 exposed through the contact holes 181 and 182, and enhance adhesion between the end portions and external devices such as driving ICs 440 and 540 shown in FIG. 3.

The connecting members 97 are connected to the data lines 171 through the contact holes 186, and they are also connected to the inspection lines 125 through the contact holes 187 such that the test signals for data lines supplied through the test pads 126 are transmitted to the data lines 171.

Now, the operation of the LCD will be described in detail.

The signal controller 600 equipped on the PCB 550 receives, from an external graphic controller (not shown), RGB image signals (R, G, and B) and input control signals for controlling the display. For example, the input control signals may include a vertical synchronization signal Vsync, a horizontal synchronization signal Hsync, main clock signal CLK, and a data enable signal DE. The signal controller 600 generates gate control signals CONT1 and data control signals CONT2 based on the input control signals, and processes the image signals (R, G, and B) adaptively to an operating condition of the LC panel assembly 300. Subsequently, the signal controller 600 sends the gate control signals CONT1 to the gate driver 400, and sends the data control signals CONT2 and the processed image signals (R', G', and B') to the data driver 500.

The gate control signals CONT1 include a vertical synchronization start signal STV that notifies of start of a frame, a gate clock signal CPV that controls output timing of the gate-on voltage $V_{on}$, and an output enable signal OE that limits the width of the gate-on voltage $V_{on}$. The data control signals CONT2 include a horizontal synchronization start signal STH that notifies of the start of a horizontal period, a load signal LOAD or TP that triggers application of appropriate data voltages to the data lines $D_1$-$D_m$, an inversion control signal RVS that reverses the polarity of the data voltages with respect to the common voltage $V_{com}$, and a data clock signal HCLK. Hereinafter, the polarity of the data voltage should be understood as being described with respect to the common voltage $V_{com}$, unless otherwise specified.

The gate control signals CONT1 are supplied to the gate driver 400 through the driving signal lines 523 and 323, and the data control signals CONT2 and the image signals are supplied to the data driver 500 through the lead lines 321.

Meanwhile, the driving voltage generator 700 generates the gate-on voltage $V_{on}$ and the gate-off voltage $V_{off}$, while the gray voltage generator 800 generates a plurality of gray voltages and accordingly applies them to the data driver 500.

During this, signals such as the gate clock signal CPV and the output enable signal OE, included in the gate control signal CONT1, are supplied in parallel to each gate driving IC 440 through the signal lines 523 and 323. Signals such as the vertical synchronization start signal STV are supplied to the first gate driving IC 440 through the signal lines 523 and 323.

In addition, the gate-off voltage $V_{off}$ and the ground voltage are supplied in parallel to each gate driving IC.

The data driver 500 sequentially receives image data (R', G', and B') by amounts that are to be processed at one time according to the data control signal CONT2 from the signal controller 600, and converts the image data (R', G', and B') to corresponding data voltages selected from gray voltages of the gray voltage generator 800.

Responsive to the gate control signals CONT1 from the signal controller 600, the gate driver 400 sequentially applies the gate-on voltage $V_{on}$ to the gate lines $G_1$-$G_n$, and thereby turns on switching elements Q connected thereto.

While switching elements Q connected to one of the gate lines $G_1$-$G_n$ remain turned-on due to application of the gate-on voltage $V_{on}$ thereto (this period is called "1H" or "one horizontal period" and equals a period of the horizontal synchronization signal Hsync, the data enable signal DE, and the gate clock CPV), the data driver 500 supplies data voltages to the data lines $D_1$-$D_m$. The data signals supplied to the data lines $D_1$-$D_m$ are applied to corresponding pixels through the turned-on switching elements Q.

The difference between the common voltage $V_{com}$ and the data voltage applied to a pixel functions as a charging voltage (also called pixel voltage) of the LC capacitor $C_{LC}$. LC molecules are orientated depending on the magnitude of the pixel voltage, and the orientations determine polarization of light passing through the LC capacitor $C_{LC}$. The polarizers (not shown) convert such determined polarization of the light to transmittance thereof.

During a frame, the gate-on voltage $V_{on}$ is sequentially applied to each of the gate lines $G_1$-$G_n$ by recursively applying this process to all subsequent gate lines, and therefore every pixel receives its data signal.

When a subsequent frame starts after a previous frame is finished, the inversion control signal RVS applied to the data driver 500 is controlled such that polarity of the data voltage applied to each pixel is reversed from that in the previous frame (which is called "frame inversion"). The inversion control signal RVS may be controlled such that polarities of the data voltages that flow through the same data line may be altered in the same frame (which is called "line inversion"), or such that polarity of a data voltage applied at one instance is reversed (which is called "dot inversion").

This process is hereinafter described in further detail.

The uppermost gate driving IC 440 that firstly receives the vertical synchronization start signal STV selects the gate-on voltage $V_{on}$ from the two voltages $V_{on}$ and $V_{off}$ of the driving voltage generator 700, and subsequently outputs the selected gate-on voltage $V_{on}$ to the first gate line $G_1$. The gate-off voltage $V_{off}$ is applied to all the other gate lines $G_2$-$G_n$.

Meanwhile, the leftmost data driving IC 540, having all its image signals stored, receives image signals for subsequent data driving ICs 540 and transmits them to an adjacent data driving IC 540 via the connecting lines 541. In this way, each data driving IC 540, having its image signals stored, receives image signals for subsequent data driving ICs 540 and transmits them to an adjacent data driving IC 540 via the connecting lines 541.

Switching elements Q connected to the first gate line G, are conducted by the gate-on voltage $V_{on}$, and data signals for the first row are applied to the LC capacitors $C_{LC}$ and the storage capacitors $C_{ST}$ of all pixels in the first row through the switching elements Q.

When the charging of the capacitors $C_{LC}$ and $C_{ST}$ in the first row is finished in a predetermined period, the uppermost (i.e., first) gate driving IC 440 applies the gate-off voltage $V_{off}$ to the first gate line $G_1$ such that the switching elements Q connected thereto are turned off, and applies the gate-on voltage $V_{on}$ to the second gate line $G_2$.

When every gate line connected to the first gate driving IC 440 has been applied with the gate-on voltage $V_{on}$ at least once according to recursion of this process, the first gate driving IC 440 supplies a carry signal, i.e., a signal for notifying finishing of scanning, to the second gate driving IC 440.

At receipt of the carry signal, the second gate driving IC 440 executes scanning, in the same way as described above, for all gate lines connected thereto. When the scanning for all its gate lines is finished, the second gate driving IC 440 supplies the carry signal to a subsequent gate driving IC 440 via the signal line 323. When the final gate driving IC 440 finishes its scanning operation in this way, a frame becomes fully processed.

A VI test method for inspecting the data lines $D_1$-$D_m$ and pixels of an LCD that executes such a display operation is hereinafter described in detail.

Firstly, when the LC panel assembly 300 is manufactured, the switching elements Q are turned on by applying the gate-on voltage $V_{on}$ to the gate lines $G_1$-$G_n$ using an inspection apparatus (not shown).

In this state, a test signal for data lines is applied to a test pad 126 with a probe (not shown) of the inspection apparatus, and accordingly, the test signal is transmitted to corresponding data lines, i.e., either the odd-numbered data lines or the even-numbered data lines, through the inspection line 125. Therefore, pixels on the gate line supplied with the gate-on voltage $V_{on}$ become bright in correspondence with the voltage of data test signal. Black and white colors are usually used in order to enhance comparison of brightness in the VI test.

Subsequently, an inspector examines the display status such as for brightness of pixels by eye to check for disconnection of the gate lines and data lines and the operation of the LCD.

When a VI test for data lines corresponding to one test pad is finished, supplying of the test signal is switched from the current test pad to the remnant test pad, and subsequently, the remnant data lines, i.e., either the even-numbered data lines or the odd-numbered data lines, are inspected in the same way described above.

When the VI tests for all the data lines $D_1$-$D_m$ are finished, the inspection lines 125 interconnecting the test pads 126 and the data lines are cut along a cutting line L using an appropriate apparatus such as a laser trimming device.

The embodiment is explained in connection with testing of the data lines of an LCD. However, it is notable that the spirit of the present invention is also applicable to a case of testing the gate lines of an LCD.

The embodiment is explained in connection with an LCD that has gate drivers and data drivers formed as chips directly on its LC panel assembly.

However, it is notable that the spirit of the present invention is also applicable to an LCD that has either or both of the data driving ICs and gate driving ICs formed on FPC films, and also to an LCD wherein the gate driver and/or data driver is formed directly on the LC panel assembly in the same process for the TFTs, gate lines, and/or data lines.

As described above, the locations of test pads and inspection lines for the testing of the data and gate lines are moved from between driving ICs to under the driving ICs, and therefore, spatial room of the LC panel assembly is enhanced.

Furthermore, the connecting lines interconnecting driving ICs can be formed in a linear pattern without curves or winding, and accordingly, resistance and signal delay in the lines are reduced.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A liquid crystal display comprising:
   a TFT array panel including a plurality of first display signal lines, a plurality of second display signal lines crossing the first display signal lines, a plurality of switching elements electrically connected to the first display signal lines and the second display signal lines, and a plurality of pixel electrodes electrically connected to the switching elements;
   a driver disposed on the TFT array panel proximate to one edge of the TFT array panel;
   an inspection line formed on the TFT array panel and passing under a place where the driver is formed for transmitting a test signal to the second display signal lines,
   a test pad formed on the TFT array panel and connected to the inspection line, for receiving the test signal, and
   a flexible film attached to the TFT array panel,
   wherein the inspection line is electrically separated from the first and second display signal lines, the switching elements, and the pixel electrodes,
   the test pad is disposed between the driver and the one edge of the TFT array panel, and the test pad is located under the place where the flexible film is formed.

2. The liquid crystal display of claim 1, wherein the inspection line comprises at least two inspection lines, and the second display signal lines are alternately connected to the at least two inspection lines.

3. The liquid crystal display of claim 1, wherein the driver includes a plurality of drivers connected to the second display signal lines.

4. The liquid crystal display of claim 3, further comprising a plurality of connecting lines interconnecting the drivers.

5. The liquid crystal display of claim 4, wherein the connecting lines extend straight.

6. The liquid crystal display of claim 4, wherein the test pad is closer to the one edge of the TFT array panel than to the connecting lines.

7. The liquid crystal display of claim 3, wherein each of the drivers is formed as a chip.

8. The liquid crystal display of claim 1, further comprising a connecting member including the same layer as the pixel electrodes, wherein the connecting member is connected to at least one of the inspection line and the second display signal lines.

9. The liquid crystal display of claim 8, wherein the inspection line includes the same material as at least one of the first display signal lines, the second display signal lines, and the pixel electrodes.

10. A liquid crystal display comprising:
    a TFT array panel including a plurality of first display signal lines, a plurality of second display signal lines crossing the first display signal lines, a plurality of switching elements electrically connected to the first display signal lines and the second display signal lines, and a plurality of pixel electrodes electrically connected to the switching elements;
    a driver disposed on the TFT array panel proximate to one edge of the TFT array panel;
    a flexible film attached to the TFT array panel;
    driving signal lines formed on the flexible film;
    an inspection line formed on the TFT array panel for transmitting a test signal to the second display signal lines; and
    a test pad formed on the TFT array panel and connected to the inspection line, for receiving the test signal,
    wherein the inspection line is electrically separated from the first and second display signal lines, the switching elements, and the pixel electrodes, the test pad is disposed between the driving signal lines, and the test pad is located under the place where the flexible film is formed.

* * * * *